July 7, 1970 C. H. YOUNG 3,519,306
EXTENDABLE AND RETRACTABLE SUPPORT MEMBER
Filed June 19, 1968 2 Sheets-Sheet 1

INVENTOR
CHARLES H. YOUNG
BY *Wm. D. Stokes*
ATTORNEY

July 7, 1970  C. H. YOUNG  3,519,306

EXTENDABLE AND RETRACTABLE SUPPORT MEMBER

Filed June 19, 1968  2 Sheets-Sheet 2

INVENTOR

CHARLES H. YOUNG

BY WM. D. Stokes

ATTORNEY

United States Patent Office 3,519,306
Patented July 7, 1970

3,519,306
EXTENDABLE AND RETRACTABLE SUPPORT
MEMBER
Charles H. Young, 3301 Phillips St.,
Elkhart, Ind. 46514
Filed June 19, 1968, Ser. No. 738,265
Int. Cl. B60p 3/32
U.S. Cl. 296—27                        3 Claims

ABSTRACT OF THE DISCLOSURE

An extendable and retractable support system for raising and lowering the top of a vehicle in which a plurality of variable length support members connect the top to the body of the vehicle. The support members have telescopic outer members and telescopic driving sections. A belt, chain or other suitable driving means is provided to permit operation of each of the variable length telescopic members simultaneously.

This invention relates to support means and particularly to support means which may be extended and retracted. The invention herein is related to my issued patent, U.S. 3,184,261, patented May 18, 1965, filed Oct. 18, 1963, Ser. No. 317,321.

More particularly, the invention relates to extendable and retractable support means which have utility for vehicles and the like for raising and lowering the roof member thereof to increase and decrease headroom. Still more particularly, the invention relates to extendable and retractable support means which have utility in raising and lowering the roof member of vehicles in which the extendable and retractable support means are designed to be simultaneously operated from a single location.

Vehicles, such as those represented by trailers, particularly camping trailers designed for periodic use, are more effective, useful and desirable if the roof of the camper can be lowered during periods of transportation to decrease wind resistance, increase stability of the vehicle on the road and the like. After being towed to the camping area in the lowered position, it is desirable that the headroom be increased to provide comfort during occupancy of the trailer. This is ordinarily accomplished by elevating the roof member and supporting it in the elevated position by means of standards.

This invention is directed to a support means which may be quickly and easily extended from the retracted position by a brief and simple operation. The instant invention is further directed towards extendable and retractable support means which comprises a plurality of telescopic screw members which may be operated to easily and rapidly raise and lower the roof portion of a vehicle and which may be operated simultaneously from a single location.

The invention will be more clearly explained and definitely pointed out by reference to the following discussion and to the attached drawings in which.

Figure 1:
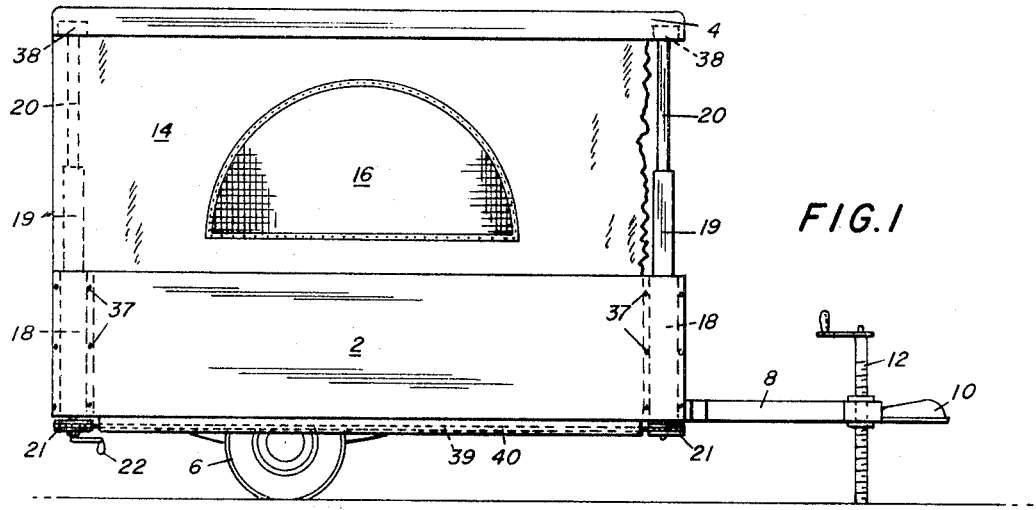
FIG. 1 represents a side view of a typical vehicle showing two of the extendable and retractable support members in their extended position.

In the drawings outlined above, reference numeral 2 designates a body portion of a vehicle shown in FIG. 1 as a camper trailer having an extendable roof member 4, wheel 6, frame 8, towing device 10 and a support mechanism 12. A fabric material 14 may be provided for the side walls of the trailer when the trailer is in the extended position. It is to be understood that the side walls of the trailer may also be formed from rigid materials of many types, such as molded plastic and metal.

The side wall may be fitted with a window of screening material shown at 16. The supporting members for the roof comprise extendable and retractable standards having concentric tubular telescopic sections 18, 19 and 20, which house a pair of screws 29 and 30. Screw 30 is an annular member having a smooth bore with a threaded outer surface. Screw 29 is an externally threaded rod having a keyway 23 cut along its length. Screw 29 is slidably inserted within and engages screw 30 by means of key 28 to permit sliding motion, but prevents relative angular motion between the two screw elements 29 and 30. The outer segment 18 of the extendable and retractable support member is firmly attached at mounting holes 37 to the body portion of the vehicle. Segment 18 carries mounting block 34 which acts as a thrust receiver and bearing for screw 29. Screw 29 carries a pair of washers 35 and 36 which engage mounting block 34 to prevent relative lateral motion between segment 18 and screw 29. Screw 29 is threadably engaged in mounting block 24 carried by segment 19 of the extendable and retractable support member. Thrust bearing 25, positioned between washers 26 and 27, is also carried by segment 19 and permits rotation of screw 30 while resisting the lateral movement of screw 30 relative to segment 19. Screw 30 is threadably engaged by mounting block 31 carried by segment 20. The outboard end of screw 30 may be provided with a bearing member 32 attached to screw 30 by washers 43 and 44 to increase the stability of the extendable and retractable support member when in its extended position. This bearing further acts to limit the maximum extension possible of the extendable and retractable support member.

As is evident from the above description of the extendable and retractable standard, during extension or retraction there is a substantially uniform or progressive feed of the elements of the telescopic support member. The two screw elements, 29 and 30, are united for rotation by a key and keyway arrangement or other suitable connection which will permit relative lateral motion of the screw elements. Segment 20 is provided with suitable means at 38 for attachment to the extendable roof member 4.

Figure 3:
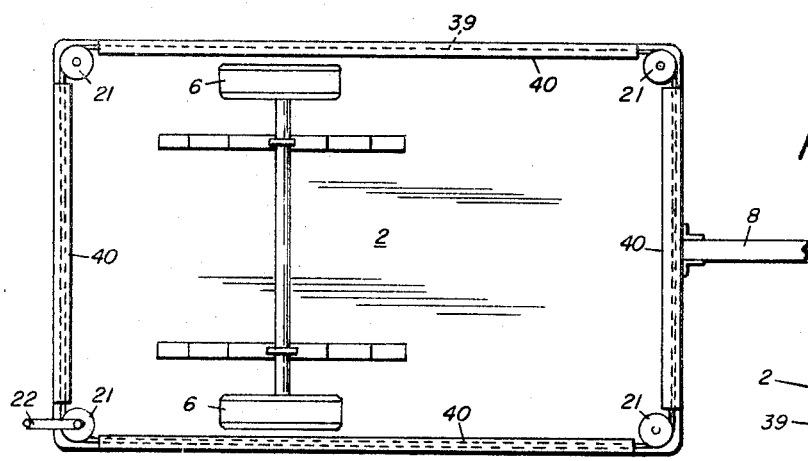
FIG. 3 represents a view of the underside of the same vehicle showing each of the extendable and retractable support members being operatively connected together by a chain or other suitable driving device to permit operation of all the extendable and retractable support members simultaneously.

As shown in the example of FIG. 3, four of the extendable and retractable standards are utilized in a typical trailer application. The pulley or sprocket 21 is attached to screw 29 in each of the four members. A chain, belt or other suitable driving device 39, positioned within guideway 40, is shown attached to each of the individual sprockets 21 on each extendable and retractable support member. By means of crank 22, the extendable and retractable support members may be caused to move upward or downward simultaneously at the same rate of telescopic extension or retraction.

Figure 8:
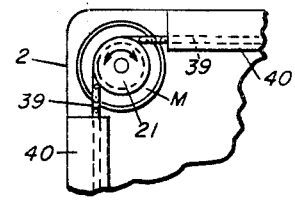
FIG. 8 represents a fragmentary view of a portion of the underside of the vehicle showing another embodiment of the invention in which a motor is used to raise and lower the operatively connected extendable and retractable standards in place of the hand actuated means shown in FIGS. 3 and 4.
Figure 4:
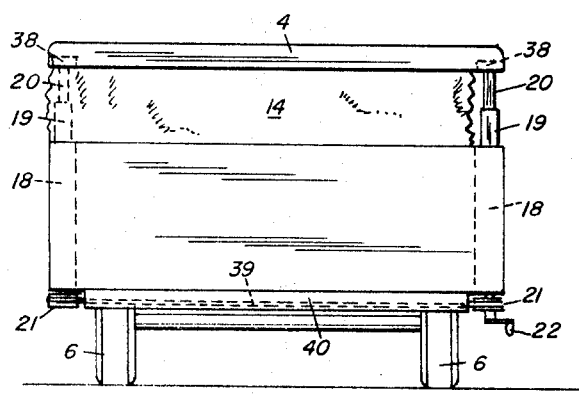
FIG. 4 is a rear view of the same vehicle with the support members partially extended and showing a hand-operated crank attached to one of the extendable and retractable support members and operatively connected by a chain or other suitable driving device to the other support members.
Figure 5:
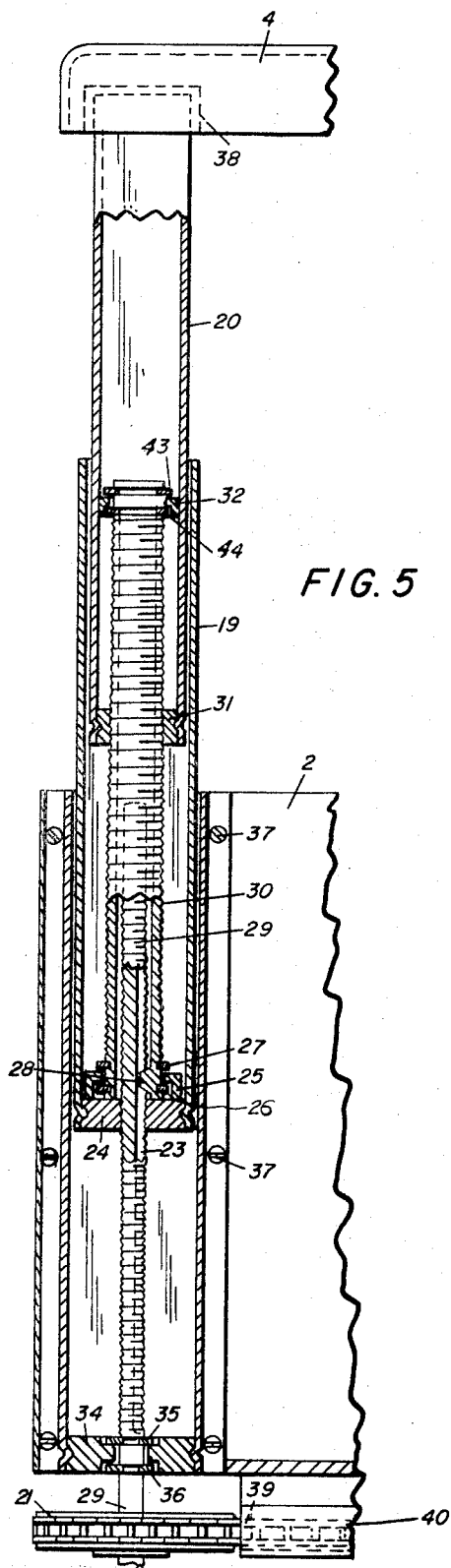
FIG. 5 represents a cross-section of the extendable and retractable support member in a partially extended position and showing the internal workings thereof.
Figure 7:
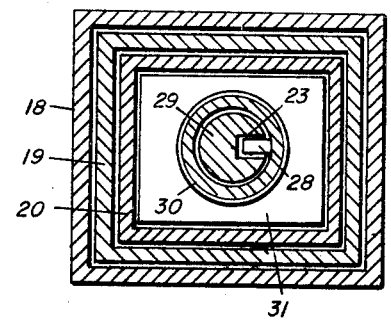
FIG. 7 represents an enlarged cross-section of the extendable and retractable standard taken along the line 7—7 of FIG. 6.
Figure 6:
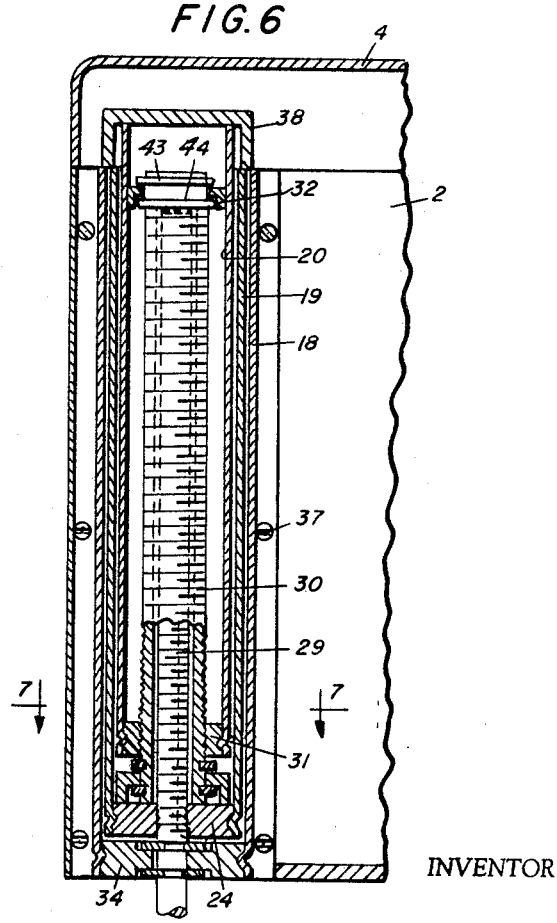
FIG. 6 represents a partial cross-section of the extendable and retractable support member in its retracted position.

It is to be understood that other actuating means may be employed to raise and lower the support members. One such embodiment of the invention is shown in FIG. 8. In FIG. 8, motor M takes the place of the hand crank shown in FIGS. 3 and 4. One small motor may be used to raise and lower a plurality of standards by causing rotation of sprocket 21, which in turn causes movement of chain 39. As shown by FIGS. 3 and 4, chain 39, or a similar connecting member, operatively links all of the extendable and retractable support members.

Figure 2:
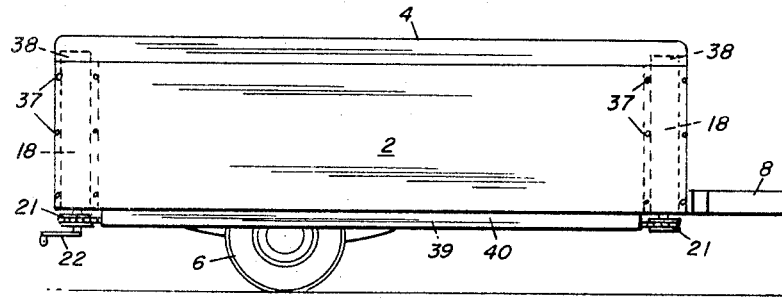
FIG. 2 is a side view of the same vehicle with the roof member lowered and showing two of the extendable and retractable support members in their retracted position.

In operation, starting from the closed condition as shown in FIG. 2, crank 22 is rotated causing screws 29 and 30 to rotate. Telescoping section 19, being threadably engaged to screw 29 by mounting block 24 is caused to move relative to section 18 which is attached to the body portion 2 of the vehicle. Screw 30, being carried by bearing 25 which is supported by mounting block 24 is caused to move with section 18, while continuing its rotative motion induced by rotation of screw 29. Mounting block 31, which threadably engages screw 30 is caused to move along screw 30 by the rotative motion of screw 30. Segment 20, which carries mounting block 31 is thus urged laterally by the compounded motion of mounting block 31, which moves along screw 30 by virtue of rotation of screw 30, and the lateral movement of screw 30. Crank 22 may be rotated until the extendable and retractable support members are fully extended or only partially extended. In operation, the telescopic standards may be extended to any point along their lengths to form a rigid support for the extendable roof member. To return the vehicle to a condition suitable for movement on roads and highways, crank 22 is merely rotated in the opposite direction until the extendable and retractable support members are fully retracted.

It is to be understood that additional telescopic elements such as 18, 19 and 20 can be added to increase the total extended length of the extendable and retractable support member. A corresponding number of additional screw elements would, of course, have to be added.

It will be understood that other embodiments of the inventive concept discussed in detail above may be designated by those familiar with the art without departing from the spirit of the instant invention.

What is claimed is:

1. An extendable and retractable support system for a camping trailer roof comprising a plurality of support members to support said roof when extended, said support members comprising a plurality of telescopic sections, telescopic driving screws means within said support members and means for rotating the driving screw means simultaneously including a single, flexible connector operatively connected with the driving screw means of each of said telescopic support members.

2. The support system of claim 1 wherein said telescopic support members comprise a fixed outer member having a driving screw mounted for rotation therein, a plurality of telescoping sections mounted so as to be housed by said fixed outer member when retracted, and a telescoping screw member connecting two of said telescoping sections and linked to said driving screw for rotation with said driving screw.

3. A vehicle having a body and an extendable and retractable roof, said roof being attached to the body by a plurality of extendable and retractable support members, each said extendable and retractable support member comprising a fixed outer member having a plurality of screw members mounted for rotation therein, a plurality of telescoping sections mounted so as to be housed by said fixed outer member when retracted, said plurality of screw members comprising a first, driving screw and a second screw mounted in telescopic relationship to said first screw to permit relative lateral motion between said screw members while said second screw is linked for rotative motion in response to rotative motion of said first screw, said screw members engaging said telescoping sections to provide a substantially uniform, progressive feed when said first screw member is rotated, and means for simultaneously rotating said first screw members of said support members.

References Cited

UNITED STATES PATENTS 2,862,253  12/1958  Place.
3,314,715  4/1967  Bontrager _____ 296—23

PHILIP GOODMAN, Primary Examiner

U.S. Cl. X.R.

52—66